United States Patent [19]

Ritchie et al.

[11] 4,028,794

[45] June 14, 1977

[54] LAMINATED CONNECTOR

[75] Inventors: Leon Thomas Ritchie; Robert George Harwood, both of Mechanicsburg, Pa.

[73] Assignee: AMP Incorporated, Harrisburg, Pa.

[22] Filed: Jan. 7, 1976

[21] Appl. No.: 647,012

Related U.S. Application Data

[60] Division of Ser. No. 504,579, Sept. 9, 1974, abandoned, which is a continuation-in-part of Ser. No. 432,121, Jan. 9, 1974, abandoned.

[52] U.S. Cl. .................................. 29/629; 156/200; 156/269; 339/17 M

[51] Int. Cl.[2] ........................................ H02G 15/00

[58] Field of Search ................. 29/628, 629, 630 R, 29/630 B; 339/17 R, 17 LC, 17 LM, 17 M; 156/200, 269, 324; 72/129, 176, 181

[56] References Cited

UNITED STATES PATENTS

| | | | |
|---|---|---|---|
| 3,221,285 | 11/1965 | Jackson et al. | 29/630 B |
| 3,239,798 | 3/1966 | Silver | 29/629 UX |
| 3,340,440 | 9/1967 | Minter | 339/17 M X |
| 3,399,452 | 9/1968 | Reid | 29/629 |
| 3,448,203 | 6/1969 | Somes | 72/181 X |
| 3,452,433 | 7/1969 | Scofield | 72/181 X |
| 3,618,207 | 11/1971 | Sand et al. | 29/629 |

*Primary Examiner*—James R. Duzan
*Attorney, Agent, or Firm*—Russell J. Egan

[57] ABSTRACT

A connector is disclosed which is made from a plurality of electrical contacts, each of which is a resilient spring, spaced along a continuous web of insulative material which serves to locate the contacts in desired positions and provides an insulation back or cover for the contacts. The method and apparatus for making the subject laminated connector is also disclosed. The plurality of contacts are first formed from a continuous strip of metal, an insulative web is laminated to the metal contacts, and the laminated connector is bent by a continuous roller or die forming operation to desired curvilinear arcuate shapes. Discrete lengths of contacts formed together with the carrier strip are broken away or otherwise separated from the carrier strip either prior to or after the bending operation.

6 Claims, 14 Drawing Figures

LAMINATED CONNECTOR

CROSS REFERENCE TO RELATED APPLICATION

This is a division, of application Ser. No. 504,579 filed Sept. 9, 1974, now abandoned, which application is a continuation-in-part of of our application Ser. No. 432,121, filed Jan. 9, 1974, now abandoned.

BACKGROUND OF THE PRIOR ART

It has been the practice in the prior art to stamp and form electrical contacts or terminals from a continuous strip of metal. The contacts at first were individually assembled to a printed circuit board and then soldered fixedly in place. The disadvantage of such a technique involved a requirement for hand labor to sort the contacts from one another, to assemble the contacts in desired alignment within the board, and to straighten the contacts in their final desired positions after soldering the contacts in place. Because hand labor is costly, there has been considerable effort directed toward reducing the amount of hand labor required for assembly of contacts to a printed circuit board. One of the first improvements to result from such effort resided in locating the terminals serially along a common carrier strip which was formed integral with the terminals during the stamping and forming process. This permitted the carrier strip to be fed into an insertion machine which individually severed a terminal from the strip and forcibly inserted it into a printed circuit board. The prior art further evolved into a technique whereby a plurality of electrical terminals along a common carrier strip were located within a comb-type tool which aligned the plurality of terminals for simultaneous insertion within corresponding locations in a circuit board. Using this technique, insertion of a larger number of terminals could be accomplished. When a plurality of terminals were simultaneously inserted, the common carrier strip served to align the terminals while the terminals were soldered fixedly in place within the printed circuit board. Subsequently, the carrier strip was removed from the terminals, leaving the terminals individually located within the printed circuit board.

Another version of the above techniques is described in U.S. Pat. No. 3,618,207 wherein a plurality of terminals, which extend transversely from a common carrier strip, have a body of insulating material molded transversely across the contacts, in the form of a continuous strip, before the carrier strip is sheared from the contacts. However, the disclosed insulative material is rigid and would prevent or hinder further steps forming the terminals into particular configurations. The molding operation is also relatively slow and costly.

According to another technique in the prior art, for example U.S. Pat. No. 3,582,865, a plurality of terminals were formed by etching out selected areas of metal plating on at least one side of a polyimide substrate. Such terminals generally required an additional substrate in order to be sufficiently rigid to make the desired electrical interconnection between circuit components, such as printed circuits and the like. Another similar multiple contact connector is described in U.S. Pat. No. 3,401,369. According to this patent, a plurality of contact members are formed on a sheet of dielectric material by conventional printed circuit forming techniques. A conductive ground plane is bonded to the opposite side of the dielectric sheet and the whole assembly is formed into a substantially U-shaped configuration to receive a plurality of spaced connectors, such as on the edge of a printed circuit board. This connector has the disadvantage of requiring multiple bonding steps which add to the cost and production time.

U.S. Pat. No. 3,239,798 described a multiple contact connector in which a plurality of spaced-apart, elongated, parallel contact strips are formed from a sheet of electrically conductive material, preferably by a known etching technique. The strip is placed between two sheets of insulation material and bonded thereto along only certain predetermined lengths of the contact strips. The ends of the strips are not bonded. The ends of the strips are formed into alternate arcuately extending resilient contacts and the laminar center portion is formed into a channel. The alteration of the arcuate ends causes the non-bonded insulation material to be separated from the formed contact ends to allow electrical contact with suitable circuitry. The steps of forming the connector according to this patent are quite complex.

SUMMARY OF THE INVENTION

The present invention relates to a method of forming a plurality of electrical contacts having an accurate, fixed, parallel spaced relationship. According to the invention, a standard means, such as a stamping press or roll blanking is utilized to stamp a plurality of contacts or terminals from sheet metal. The contacts or terminals are subsequently bonded in fixed parallel spaced relationship on a support web or substrate of insulation material. Instead of utilizing the stamping press to also form the contacts to desired shapes, the terminals are preferably serially conveyed between pairs of rollers which progressively form the contacts in successive stages to desired arcuate shapes. Such a roll forming technique is considerably faster than forming by a stamping press, since the rollers are merely rotated, whereas a stamping press requires a large number of opening and closing strokes to provide a forming operation. In addition, the roller surfaces have a greatly increased life as compared to the relatively short life of the stamping dies which are worn away by impact.

The invention further resides in laminating a continuous web of insulative material over a portion of each of a plurality of contacts prior to roll forming. This has the advantage that the contacts are precisely located and fixed with respect to one another by the web which further advantageously serves as an insulation covering or backing for the contacts. The contacts are preferably stamped from resilient spring material so the contacts are of sufficient thickness to be self-supporting and are yet resiliently flexible to provide contact pressure when engaged against a printed circuit board. The ends of the contacts project outwardly from the plastic sheet material to provide free-standing and self-supporting terminals. The plastic sheet material is sufficiently flexible to allow each of the contacts to flex individually with respect to itself without affecting its relationship to the adjacent contacts.

OBJECTS OF THE INVENTION

It is therefore an object of the present invention to produce a laminated connector having a plurality of electrical contacts fabricated from resilient spring material and formed into curvilinear or arcuate shapes, with the terminals being spaced and bonded to a resilient or a flexible web of material which forms an insulation cover or backing for the terminals.

Another object of the present invention is to produce a laminated electrical connector comprising a plurality of freestanding resilient spring contacts laminated to a continuous web of material which forms an insulation cover or back for the terminals, the ends of the terminals projecting outwardly from at least one side of the web to provide self-supporting electrical terminals.

Another object of the present invention is to teach a method and apparatus for fabricating a laminated connector whereby a plurality of electrical terminals are fabricated from resilient spring material, with the terminals being subsequently formed to desired curvilinear or arcuate shapes, and wherein the terminals are provided with a continuous web of insulation material bonded to at least portions of the terminals prior to forming the terminals to their desired arcuate shapes.

Other objects and many attendant advantages of the present invention will become apparent to those skilled in the art upon perusal of the following detailed description taken in conjunction with the accompanying drawings.

DETAILED DESCRIPTION OF THE INVENTION

Figure 1:
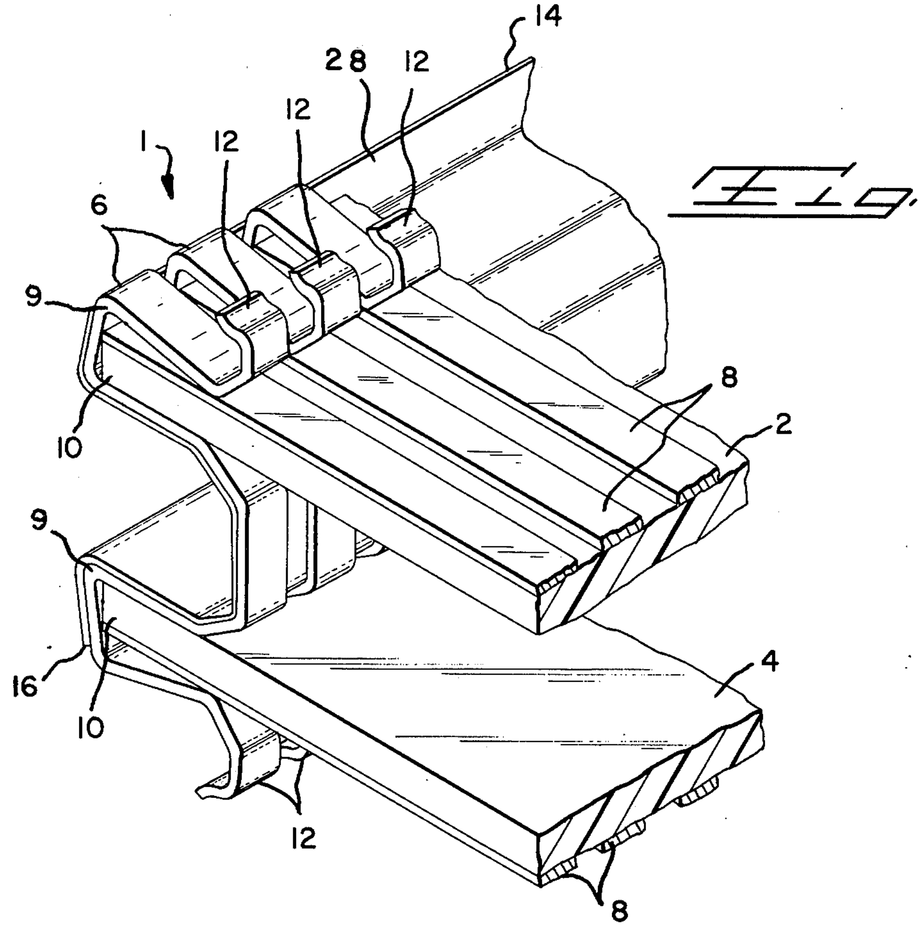
FIG. 1 is an enlarged fragmentary perspective of a laminated connector according to the present invention mounted to the edge margins of a pair of parallel printed circuit boards.

With more particular reference to the drawings, there is shown in FIG. 1 an exemplary laminated connector 1 which is connected to the edge margins of a pair of parallel spaced printed circuit boards 2 and 4. The connector 1 comprises a plurality of resilient spring terminals, some of which are shown at 6 serially spaced from one another and bonded to a backing or cover or plastic sheet material 28. The contact terminals 6 are of sufficient metal thickness to be free-standing and self-supporting. The inherent resilient spring properties of the terminals 6 permit the terminals to grip onto the printed circuit boards 2 and 4, with the terminals 6 respectively contacting the circuit pads 8 on the boards 2 and 4. As shown the terminals 6 are fabricated from resilient spring material and are of sufficient thickness to remain in permanent curvilinear or arcuate configurations which enable them to be free-standing and self-supporting without the need for a housing or other bracing material to maintain the contacts in their desired configurations. In addition, the spring material properties of the terminals permit them to be bent into generally U-shapes 9 for gripping over edge margins 10 of the printed boards 2 and 4. The inherent spring properties also permit the terminals to apply pressure at the surfaces of contact with the circuit pads 8 of the boards 2 and 4 to ensure and establish good electrical connections. Also as shown, the backing of insulative sheet material 28 is applied only to a central portion of the terminals 6, with the free ends 12 of the terminals projecting outwardly of the edge margins 14 and 16 of the sheet material 28. The backing material 28 is sufficiently rigid to prevent relative flexure between adjacent contacts while allowing individual outward flexing of the free ends of contacts 6 to accommodate variations in thickness and surface warping of the boards 4 and 2. In addition, the contact ends 12 project outwardly from the sheet margins 14 and 16 further to insure that the contacts may flex independently of one another.

Figures 3, 4:
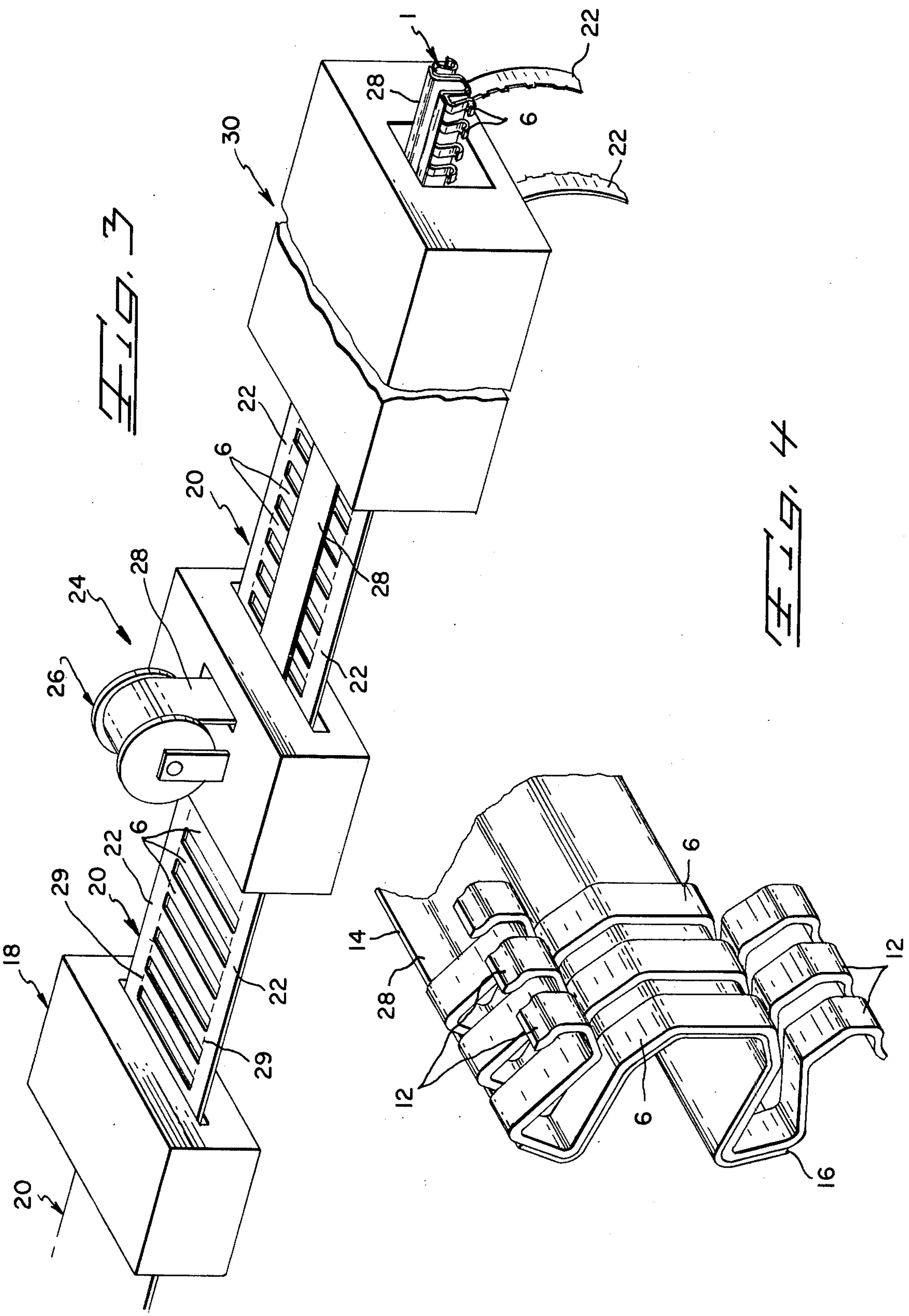
FIG. 3 is a schematic of an apparatus utilized to fabricate a laminated connector according to the present invention.
FIG. 4 is a fragmentary enlarged perspective of a laminated connector according to the present invention.

FIG. 3 of the drawings schematically illustrates an apparatus and operation for fabricating the laminated connector 1. The first stage 18 of the apparatus includes a standard stamping press or roll blanking press whereby a continuous strip of resilient spring metal 20 is fed between dies according to the practice well known in the prior art. It has been the practice in the prior art to provide the stamping press with a plurality of forming stages which would progressively impact on the contacts 6 to deform them to their desired final shapes. The design and fabrication of such forming stages requires highly skilled labor. In addition, the repeated impacting of the dies during the forming operation causes progressive die wear. The dies accordingly need to be repaired or replaced, especially in the case where the contacts to be formed are of small size, and consequently a few thousands of an inch in die wear would not be acceptable. According to the present invention, the forming stages in the stamping stage 18 are eliminated. Instead only the stamping stages of the press are utilized to provide the external outlines of the contacts 6. By elimination of the forming stages, die life is greatly increased. Instead, the present invention contemplates the forming operation to preferably take place in a roll forming operation.

To prepare the contacts 6 as they emerge from the stamping stage 18 for the roll forming stage, the contacts are conveyed through a laminating stage 24. A reel 26 containing a continuous web 28 of insulative material, such as Mylar, paper and other known materials, is placed in overlying relationship with respect to designated portions of the contacts 6, here shown as the center of the contacts. The web of material 28 is then laminated by bonding to the portions of the contacts 6 by the application of a suitable adhesive. Thus emerging from the laminating stage 24 are the contacts 6 attached to carrier strips 22, together with the insulative sheet material 28 laminated to portions of the contacts. A suitable insulation material was found to be Mylar, and a suitable binding agent for laminating the Mylar to the contacts 6 was found to be E.I. DuPont Nos. 49,000 or 49,002 adhesives. Also Kapton or Nomax plastic sheet material may be bonded with E.I. DuPont No. "WA" adhesive. The contacts 6 are maintained in alignment in this embodiment by virtue of their ends being integral with the carrier strips 22. Bonding the contacts 6 to the web 28 holds them in alignment during roll forming and afterwards. The central portions of the contacts 6 are maintained in alignment by the insulative sheet laminate 28. For example, the web is selected so as to be transversely flexible to enable deformation of the contacts to curvilinear shapes. Yet the web material is resistant to stretching and bending about its longitudinal axis, to maintain the central portions of the contacts 6 in desired alignment and in spaced relationship from one another.

The roll forming stage 30 is comprised of a series of roller pairs which progressively form the contacts 6 to curvilinear shapes, as will be explained with more particularity hereafter. The contacts may be severed from the carrier strips 22 either before or after bending of the contacts, for example in the roll forming stage 30 as illustrated in FIG. 3. Alternatively the carrier strips 22 may be left on the contacts 6 until after removal of the contacts 6 from the forming stage. As shown in FIG. 3, however, the strips 22 are removed substantially simultaneously with the start of roll forming. What emerges is shown generally at 1 as a continuous web of insulative material 28 laminated to a plurality of contacts 6 which are formed to curvilinear configurations. For example, the configurations of the contacts 6 may take the form as shown in FIG. 1.

The stamping stage may also be used to form a score 29 at the ends of the terminals 6 where they join the carrier strips 22. The contact ends are thereby weakened so that they are frangibly attached to the carrier strip permitting their separation from the carrier strip either before or after roll forming or after soldering in place within a printed circuit board.

Figure 5:
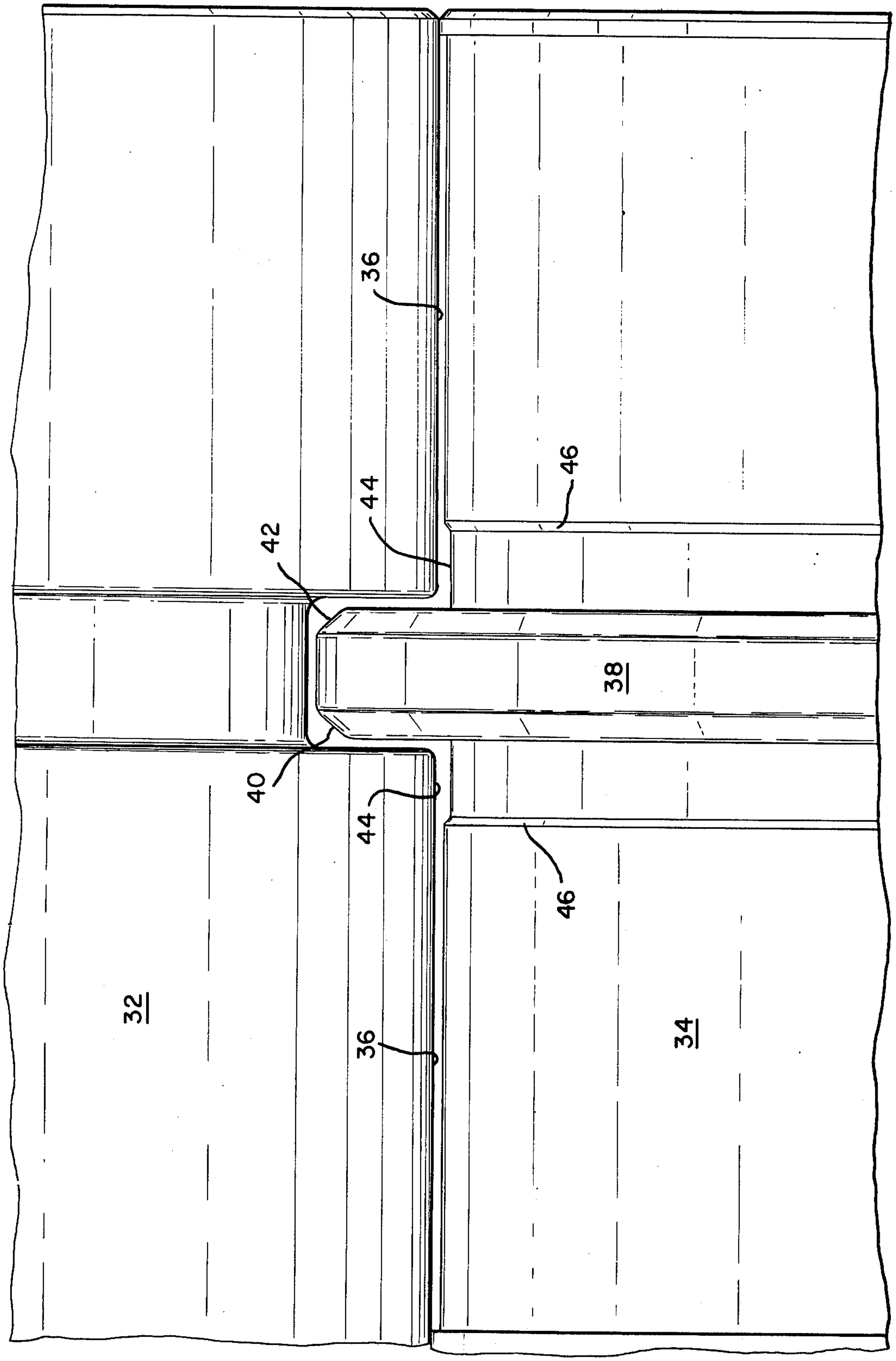
FIGS. 5, 6 and 7 are enlarged fragmentary elevations of corresponding pairs of forming rollers arranged in successive stages, which pairs of rollers are utilized to progressively form the contacts of the laminated connector into desired arcuate shapes.
Figure 6:
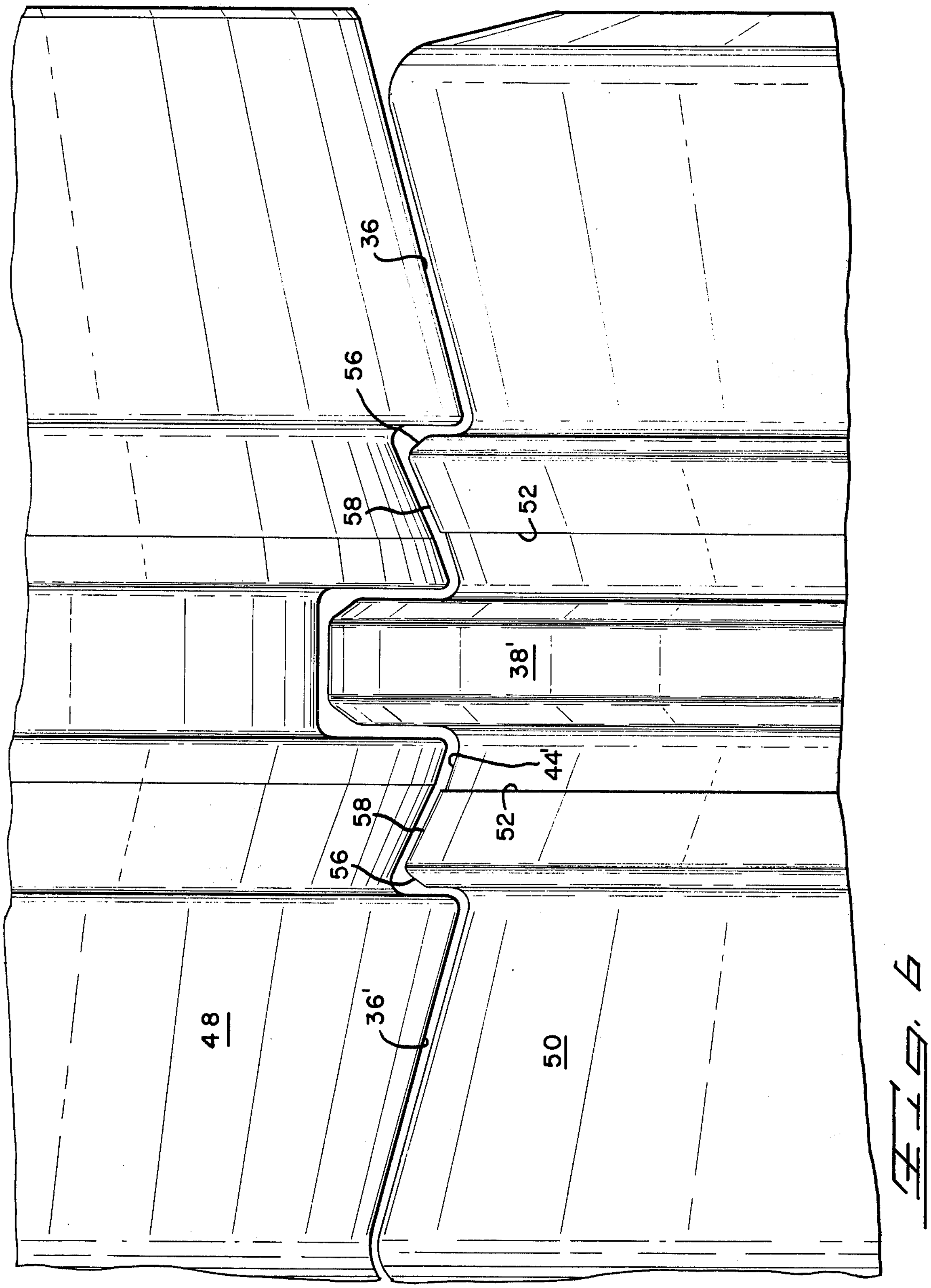

For a more complete description of the roll forming stage 30, reference will be made to FIGS. 5, 6, and 7, taken in conjunction with FIGS. 8, 9, and 10. FIG. 5 is an elevation illustrating the profiles of an exemplary pair of forming rollers 32 and 34. The rollers 32 and 34 are generally cylindrical and comprise a primary formation stage, which forms the contacts 6 into the exemplary primary configuration shown in FIG. 8. As shown in FIG. 5, the roll 34 is separated from the roll 32 by a clearance 36 to correspond with the thickness of the metal stock 20 from which the contacts 6 are stamped. The roll 34 is provided with a central enlarged section 38 chamfered on either side thereof at 40 and 42. Immediately adjacent to and in correspondence with the section 38, the clearance 36 is progressively widened at 44. This is accomplished by stepping or otherwise reducing the diameter of the roll 34 at 36 to provide a wider clearance. The wider clearance accommodates the extra thickness of the conveyed laminate assembly, such that the sheet material 28 is received into the widened clearance area 44. As the contacts 6 are fed into the clearances 36 and 44 the contacts 6 will be deformed over the section 38 to have a profile or curvilinear configuration corresponding to the surface of the section 38. From the primary forming stage, as shown in FIG. 5, the contacts 6 will be conveyed to an intermediate stage of forming rollers 48 and 50, illustrated in FIG. 6. There, the rollers 48 and 50 have generally frusto-conical surfaces defining a clearance 36′ therebetween for receiving the thickness of the metal strip 20. The forming roll 50 is provided with a reduced stepped diameter 52 defining a clearance 44′ between such reduced diameter and the diameter of the roll 48 overlying the roll 50. For example, the clearance 36′ is substantially similar to the clearance 36, and the clearance 44′ is substantially similar to the clearance 44, since the thicknesses of the stock material 20 and the sheet material 28 are desirably left substantially unchanged during the roll forming operation. The stock 20 will have the shape shown in FIG. 9 as it emerges from the forming stage provided by the rolls 50 and 48. As shown in FIG. 9 the contacts 6 are formed with curvilinear portions 54 which are the result of the roll 50 having a corresponding chamfer 56 immediately adjacent to corresponding frusto-conical portion 58 over which the contacts 6 are deformed.

Figure 7:
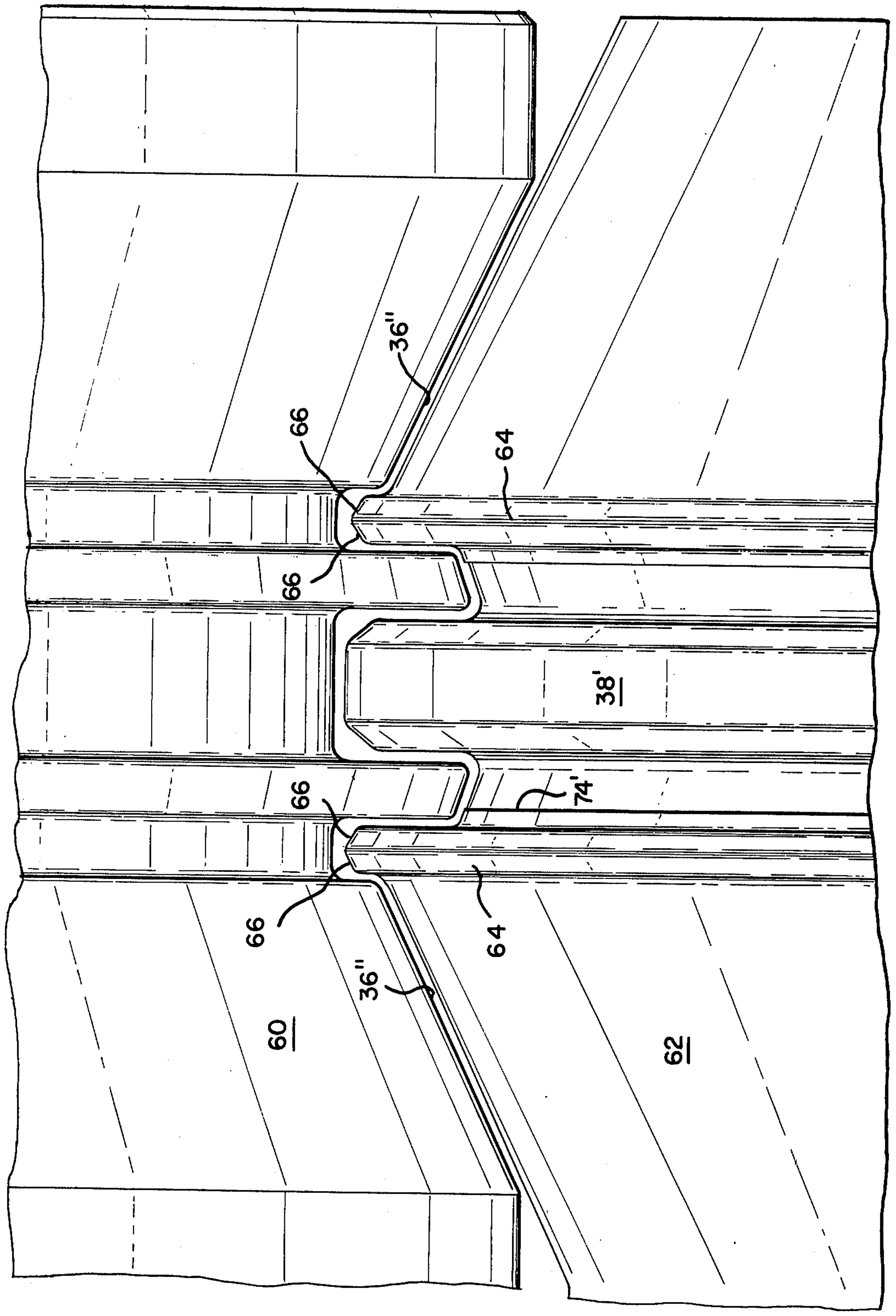
Figures 8, 9, 10:
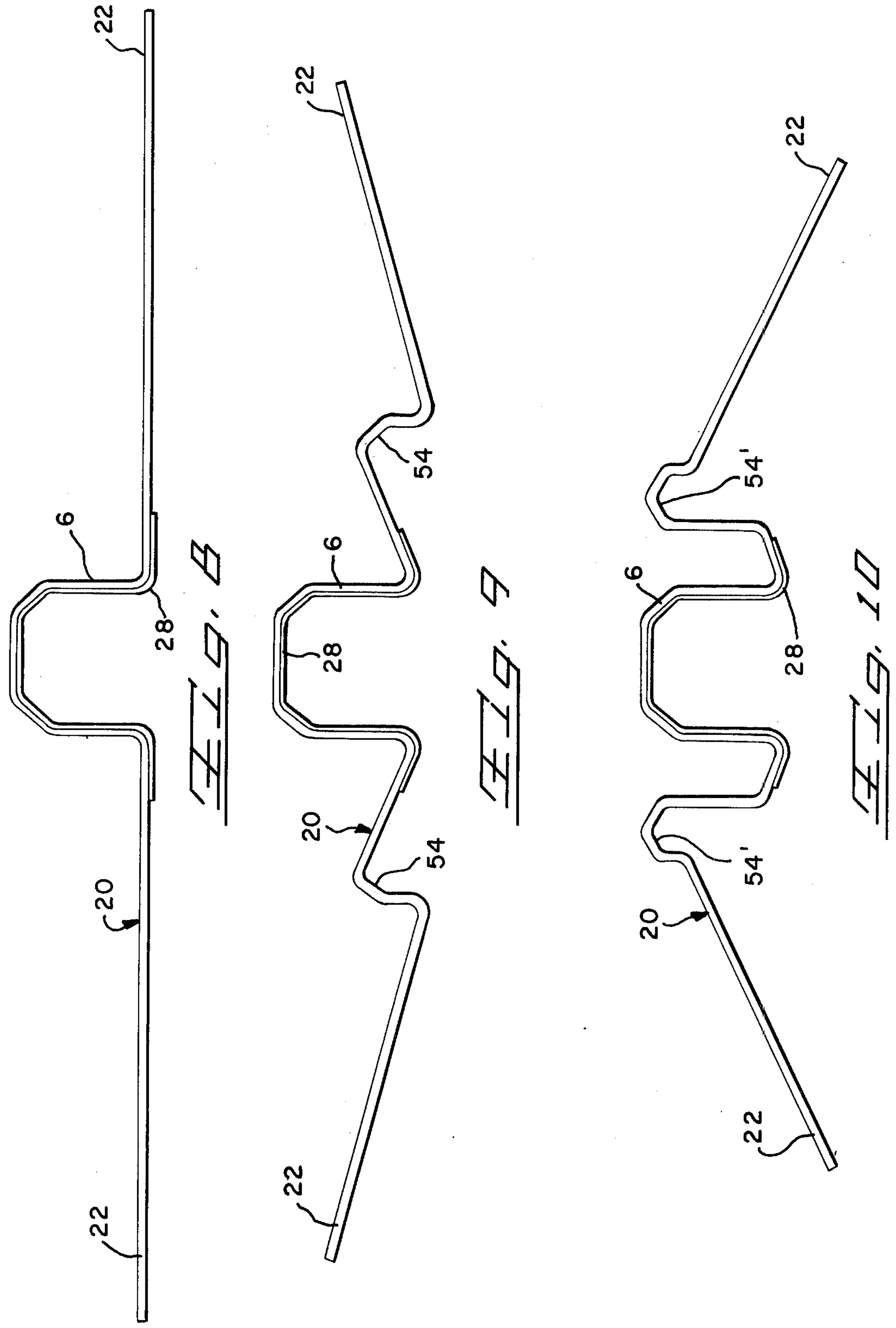
FIGS. 8, 9, and 10 are enlarged elevations illustrating the various stages of formation of the laminated connector conveyed between the successive stages of rollers illustrated in FIGS. 5–7.

As shown in FIG. 7, a secondary forming stage is provided by a pair of cooperating rollers 60 and 62. The roller 62 has generally frusto-conical portions defining a clearance 36′ with the cooperating roller surfaces 60. Again the central portion of the roller 62 is provided with an enlarged cylindrical portion 38″ similar to the portion 38 of the roller 34. On each side of the section 38″ are provided a pair of chamfered projecting sections 64 which are chamfered at 66. FIG. 10 illustrates the curvilinear shape of the contacts 6 and the stock 20 as it emerges from the forming provided by the rollers 60 and 62. More particularly, the contacts 6 are provided with a pair of curvilinear portions 54″ which involve further deformations of the radiused portions 54 of the contacts as shown in FIG. 9. What is to be emphasized in the roll forming operation of the present invention is that the desired arcuate or curvilinear configurations of the contacts 6 must be obtained by gradual and progressive deformation of the metal stock 20 in successive stages to prevent breakage or jamming of the metal stock within the roll forming stages provided by the pairs of cooperating rollers. In actual practice, a larger number of stages of roller pairs are required than as shown in FIGS. 5, 6, and 7. Accordingly the illustrated rolling and forming stages are exemplary only. An advantage in using roll forming rather than stamping to produce equivalent configurations of the contacts 6 is that rolling friction results in slower rates of die wear than does impacting during a stamping operation. In addition, the cooperating roller surfaces are easier to tool than stamping dies. Of course, stamping dies may be tooled to provide more complex shapes, such as box enclosures, than can be made available by roll forming apparatus. For example, the surfaces of the forming rollers must either be perpendicular to or tapered outwardly from the axis of rotation of the rollers. Otherwise, the metal stock would not be able to be conveyed between the rollers but would be formed in gripping position over the surface of the rollers, preventing removal from the rollers for conveyance toward successive stages in the rolling operation.

Figure 2:
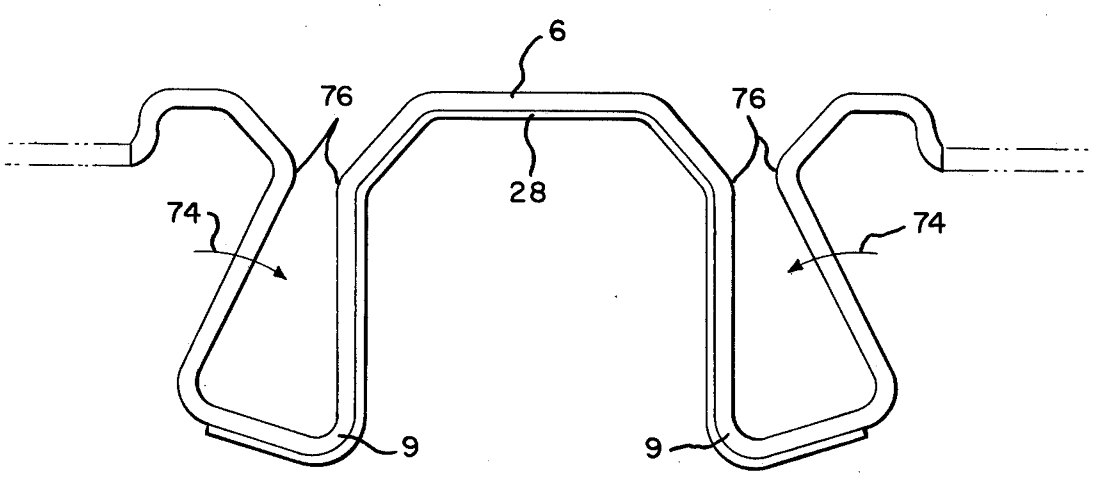
FIG. 2 is an enlarged side elevation of the laminated connector illustrated in FIG. 1.
Figure 11:
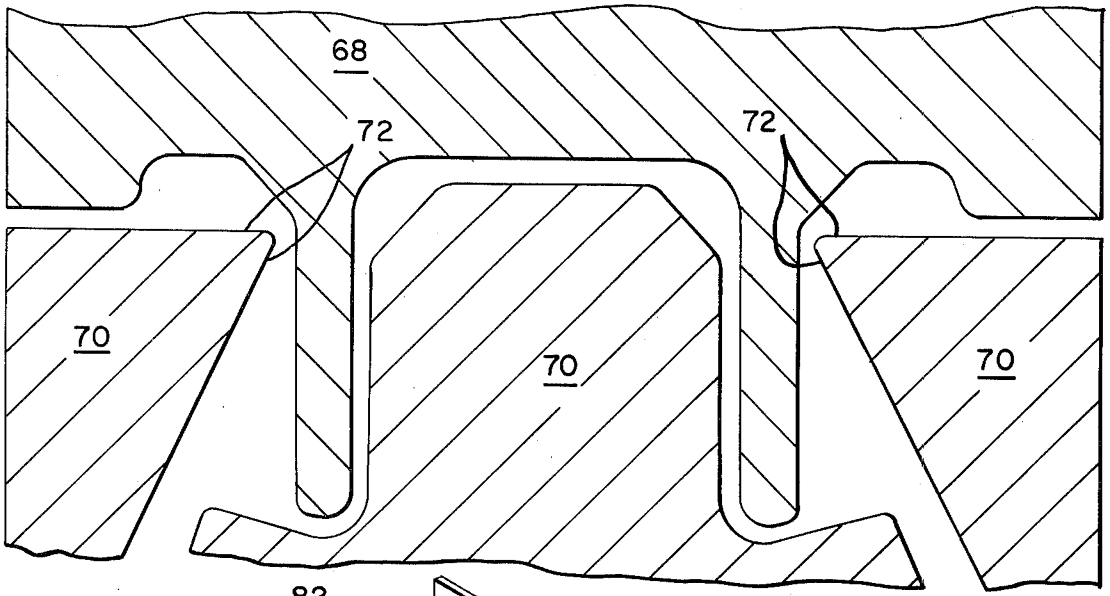
FIGS. 11 and 12 are a fragmentary elevation and a fragmentary perspective, respectively, of another embodiment of the present invention.

It is however, often desired to provide inclinations in the curvilinear configurations of the contacts which would not ordinarily be available by ordinary roll forming operations. This can be accomplished by first forming the desirable curvilinear configurations by the successive stages of rollers, then utilizing a final stage where little forming is performed, but any loops or U-shaped areas of the curvilinear configurations may be further closed. This is shown more particularly with reference to FIGS. 11 and 12. In FIG. 11 a pair of final stage cooperating rollers 68 and 70 are illustrated. In this operation, the rollers 68 and 70 do not cooperate fully, since very little deformation is to be accomplished. Instead, the roller 70 is provided with an inclined forming surface 72 which serves, not primarily to provide smaller radii of curvature in the contacts 6, but to provide pivoting deformation forces in the direction of the arrows 74 shown in FIG. 2. Such deformation forces partially close the looped or U-shaped configurations in the contacts 6 for purpose to be explained. More particularly the partially closed looped portions thereby provide relatively narrow neck portions 76 opening into the loop portions of the curvilinear contact configurations. Therefore by utilizing a final pivoting stage in the roll forming stages 30, it is possible to provide closed loop portions in a contact configuration which would not ordinarily be possible by roll forming techniques prevalent in the prior art. It is of course to be emphasized that contacts of relatively miniature size can be provided with curvilinear configurations by roll forming. For example, an exemplary contact size contemplated to be formed by the present invention has the following dimensions:

The stock 20 is selected from No. 725 Copper Association designation copper having a thickness of 10 mils, the height of the curvilinear portions is 0.91 inches and a continuous web of insulative material 28 is of 5 mils thickness. To allow relative ease during the roll forming operation, the insulative material 28 has limited flexibility as described above. In addition, the flexible nature of the insulative material 28 permits each of the contacts 6 to operate independently as a resilient spring. This is shown more particularly in FIG. 4 wherein the insulative material 28 is shown laminated to only central portions of each of the contacts 6. The ends 12 of the contacts are permitted to project outwardly beyond the side margins 14 and 16 to provide cantilever springs. The narrow neck opening 76 are selected to be of slightly less width than the thicknesses of the boards 2 and 4 such that when the boards are inserted through the narrow neck openings the contacts 6 will be resiliently deflected. As a result the inherent resiliency of the contacts 6 will provide pressure upon the contact ends 12 to insure a good electrical connection of the contact ends with the corresponding electrical pads 8 of the boards.

Figure 12:
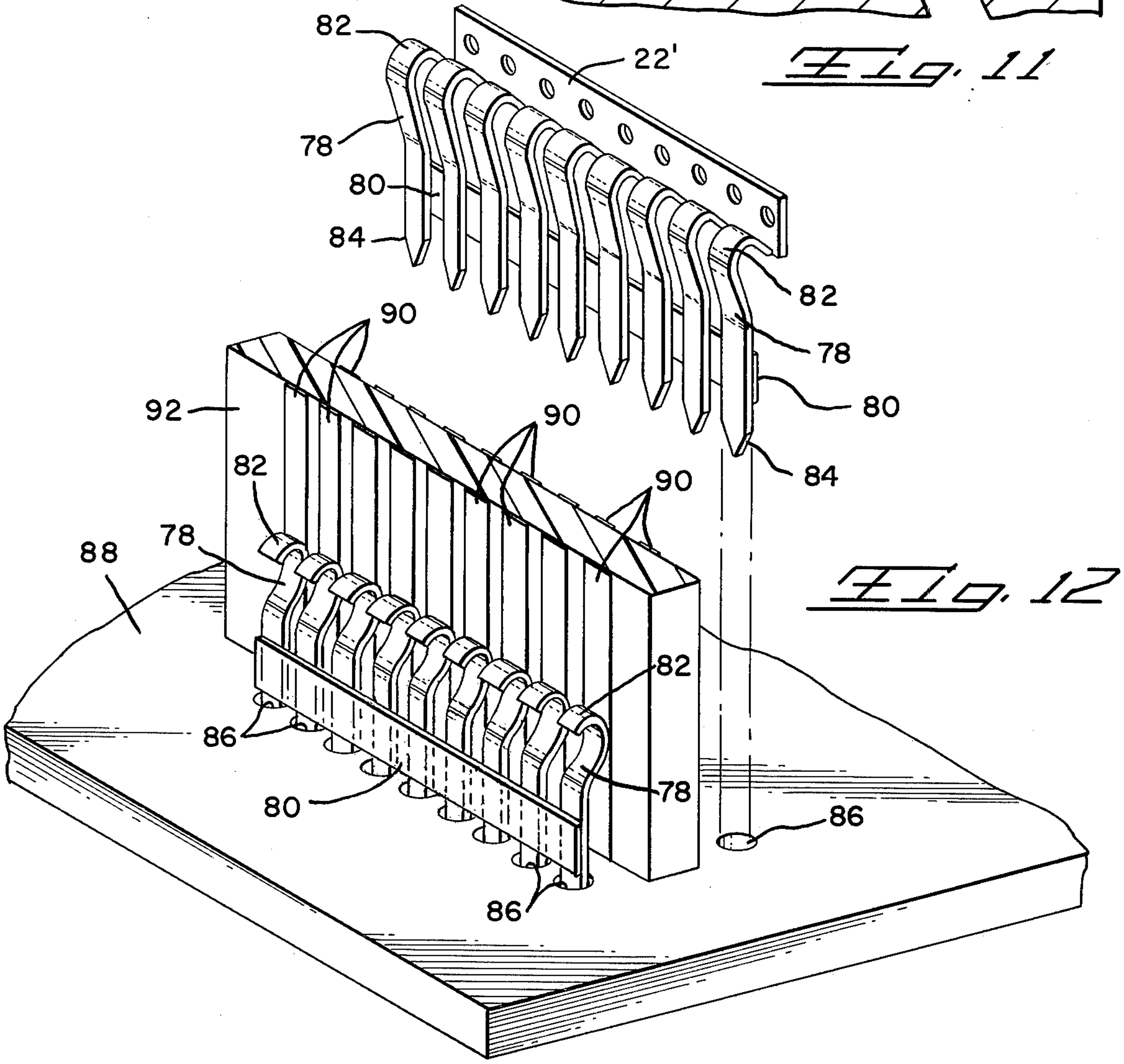

FIG. 12 is illustrative of another embodiment of the present invention wherein a plurality of curvilinear contacts 78 are bonded to and spaced along a continuous web of insulative material 80. As shown the ends 82 and 84 of the contacts 78 project outwardly from the side margins of the insulative material 80 to provide electrical terminal portions. For example, the projecting ends 84 may be inserted within a row of corresponding apertures 86 provided in a printed circuit board 88 leaving a row of contacts 78 maintained in spaced relationship by the laminate 80. The ends 84 of the terminals may then be soldered in place to permanently affix the contacts 78 in mounted position on the printed circuit board. The ends 82 of the contacts 78 may engage against corresponding electrical pads 90 provided on another printed circuit board 92 which is, for example inserted between two rows of contacts 78. Insertion of the printed circuit board 92 will resiliently deflect the contacts 78. The inherent resiliency of the contacts 78 will apply spring pressure to the ends 82 of the contacts to establish good electrical connections with the circuit pads 90. In this case it may be desirable to maintain a common carrier strip 22', which is similar to the carrier strip 22 attached to the contacts 78, even after formation of the contacts to their curvilinear configurations in a roll forming stage similar to the one illustrated at 30 in FIG. 3. In this manner an entire row of contacts 78 may be located within respective apertures 86 of the printed circuit board 88, using the carrier strip 22' and also the insulative material 80 to align the contacts prior to and during soldering of the contacts 78 to the printed circuit board. Subsequently, the carrier strip 22' may be removed such as by breaking or otherwise severing it from the row of contacts 78.

In each embodiment illustrated the sheet material 28 provides flexible webs of insulation separating and maintaining the contacts in desired spaced relationship. The web portions are severable as desired to select any desired number of contacts for an intended use.

Figure 13:
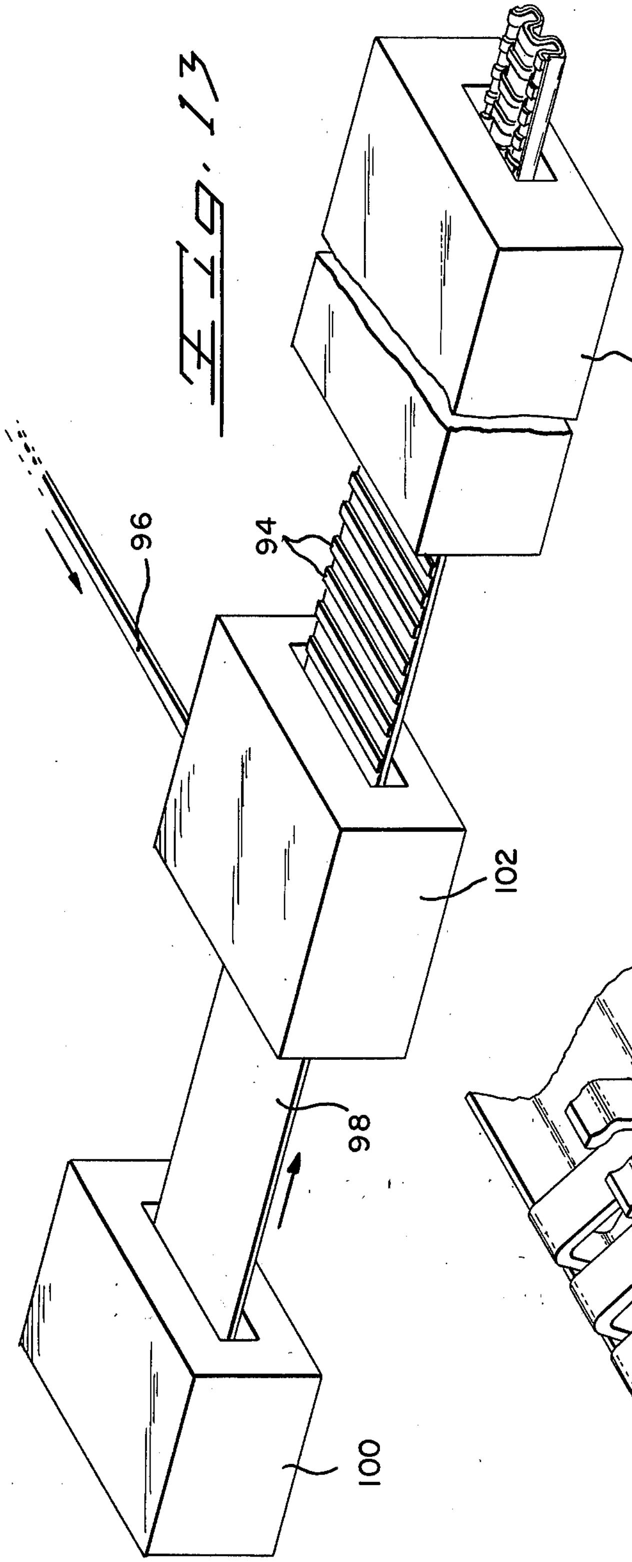
FIG. 13 is a schematic of an alternate apparatus for fabricating a laminated connector according to the present invention.

The apparatus schematically shown in FIG. 13 severs individual contacts 94 from a continuous band or reel of metal contact material 96 and deposits the separate contacts transversely across a moving web 98 of insulation material, such as Mylar or paper as described above. The web 98 is fed from a supply 100 to the bonding station 102. The contacts are deposited in parallel spaced configuration on web 98 and are bonded thereto. In order to accomplish the bonding, the web can be pretreated with a suitable adhesive. Bonding can be accomplished by pressure, heat or a combination thereof. The strip of insulating web with contacts bonded thereto is sent through a forming station 104 in the manner previously described with reference to FIGS. 5 to 10.

Figure 14:
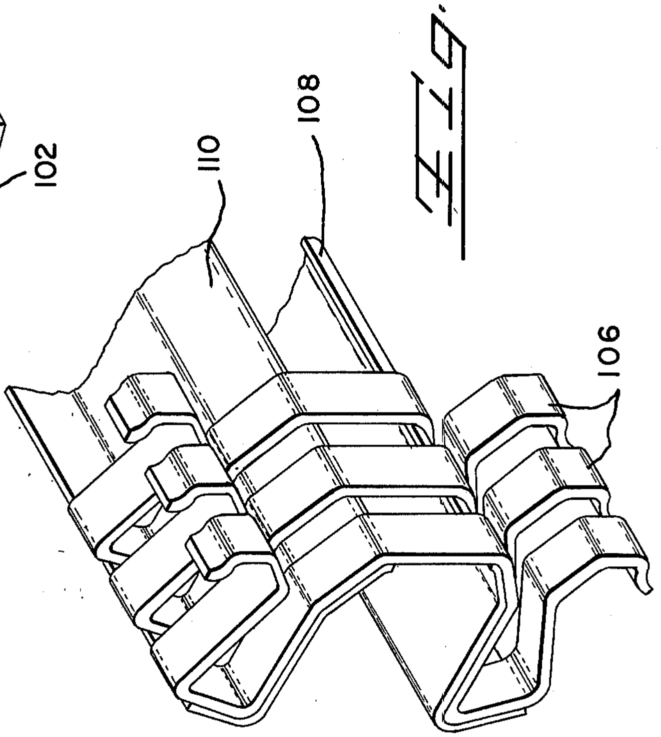
FIG. 14 is a fragmentary enlarged perspective of an alternate embodiment of a laminated connector according to the present invention.

FIG. 14 shows another alternative embodiment of the subject connector strip. In this embodiment each contact 106 is bonded to a pair of parallel spaced insulation webs 108, 110. This is simply to illustrate that one or more webs can be used for each strip of contacts regardless of which of the above described methods are used to form the strip.

An example of suitable contact material has been given above. This contact material can, if desired, be preplated, plated after forming or spot plated in order to achieve the desired contact surface.

What has been described and illustrated are exemplary laminated connector configurations, as well as apparatus and method for making the same. Likewise, reference to use of the subject connector to interconnect printed circuit boards is simply an example and not an exclusionary use. It should be understood that other modifications and embodiments of the present invention will become apparent to one having ordinary skill in the art from the spirit and scope of the appended claims.

What is claimed is:

1. A method for making a free standing and self-supporting multi-terminal electrical connector, comprising the steps of:

cutting a plurality of elongated contacts from a continuous sheet of electrically conductive resilient spring material;

laminating at least one continuous web of flexible insulative support material to intermediate portions of each of said contacts to hold them in fixed parallel spaced relationship, each said contact having at least one end projecting beyond a marginal edge of said web, said web being sufficiently rigid to prevent relative flexure between adjacent contacts while allowing individual outward flexing of the free ends of the contacts; and bending portions of said metal contacts into permanent curvilinear shapes to define at least one substantially U-shaped end portion adapted to grippingly receive a mating member therein, said contacts being separated from one another lengthwise along said insulative support material, said contacts being of sufficient metal thickness to be free standing and self-supporting and to provide resilient spring action for applying pressure at said contact end portions.

2. A method according to claim 1 wherein said contacts are cut from a continuous sheet of material and are initially connected to at least one continuous, common carrier strip; and removing said carrier strip from said contacts after said laminating and bending steps leaving said contacts independent of one another and fixedly spaced along the insulative support material.

3. The method as recited in claim 1, wherein said step of bending further includes the steps of:

passing said contacts and said web of insulative material between successive pairs of forming rollers which bend said contacts into curvilinear leaf springs; and maintaining the ends of said leaf springs in mutual alignment to provide a row of electrical terminals.

4. The method as recited in claim 3, further including the step of:

providing recessed clearances between said pairs of rollers for receipt of the web of insulative material.

5. The method as recited in claim 3, further including the steps of:

passing said contacts between said pairs of rollers in a direction lengthwise of said carrier strip; and aligning said contacts by said carrier strip during passage between said series of rollers.

6. A method according to claim 1, wherein said contacts are cut from a continuous sheet of material and are initially connected to at least one continuous, common carrier strip; and removing said carrier strip from said contacts after said laminating step and prior to said bending step leaving said contacts independent of one another and fixedly spaced along the insulative support material.

* * * * *